Jan. 16, 1968   R. ROULET   3,364,353
APPARATUS HAVING OPPOSING CIRCUITS OF DIFFERENT TIME
CONSTANTS FOR DETECTING BETA AND GAMMA RADIATION
IN THE PRESENCE OF BACKGROUND RADIATION
Filed Jan. 15, 1964   5 Sheets-Sheet 5

United States Patent Office 3,364,353
Patented Jan. 16, 1968

3,364,353
APPARATUS HAVING OPPOSING CIRCUITS OF DIFFERENT TIME CONSTANTS FOR DETECTING BETA AND GAMMA RADIATION IN THE PRESENCE OF BACKGROUND RADIATION
Roger Roulet, Grenoble, France, assignor to Commissariat à l'Energie Atomique, Paris, France
Filed Jan. 15, 1964, Ser. No. 337,901
Claims priority, application France, Jan. 16, 1963, 921,563
5 Claims. (Cl. 250—83.3)

The invention relates to a fixed gantry-type $\beta$ and $\gamma$ radiation detector adapted to give a warning if a person passing below the gantry gives off $\beta$ or $\gamma$ radiation either because such a person is heavily contaminated or because such person is carrying radioactive items.

A disadvantage of known systems of this kind is that when near a nuclear reactor they emit a background noise which makes them very inconvenient to use.

It is an object of the invention to provide a detection device of the kind specified for use at exits from premises where there are reactors or at exits from laboratories where there is a heavy $\beta$ and $\gamma$ background noise, the operation of the device requiring no action on the part of the personnel checked except possibly for stoppage of the warning by means of a simple push-button.

The $\beta$ and $\gamma$ radiation detection system according to the invention comprises two circuits supplied by devices responsive to the radiations to be detected and arranged to buck one another and connected to an indicator in order that a zero indication may be given by a strong background noise of substantially constant level; the two circuits have different time constants so that an out-of-balance voltage is detected by the indicating device when the output levels of the two circuits vary rapidly enough.

In a preferred embodiment, the system is mounted on a gantry so as to check the radioactivity of personnel or articles passing below the gantry and trigger a warning if the detected radioactivity exceeds a desired value. The circuits having different time constants are integrators, the time constants being of the order of seconds; and the radiation-sensitive elements are Geiger-Muller detectors disposed inside the gantry uprights. Advantageously, the difference between the time constants of the integrating circuits is more than 5 seconds.

The apparatus comprising a gantry and an electronic device mounted thereon is arranged to give a warning if a person passing below the gantry gives off a radioactive radiation because he is heavily contaminated or because he is carrying radioactive items. Actually, the apparatus is substantially insensitive to the ambient level of radiation; for instance, the warning can be set to be triggered when activities of about 30a Ci for $\gamma$ rays having energy value of 1 MeV. and 20$\mu$ Ci for $\beta$ rays having energy value of 1 MeV. pass below the gantry, the rate at which the radioactivity moves past the detectors being a person's normal walking speed. The system can be used to check people, for instance, the staff of a reactor plant, and to trigger a warning if a radioactive source passing by the detector exceeds the limit as hereinbefore defined.

The invention will now be described by way of example with reference to the accompanying drawings in which.

Figure 1:
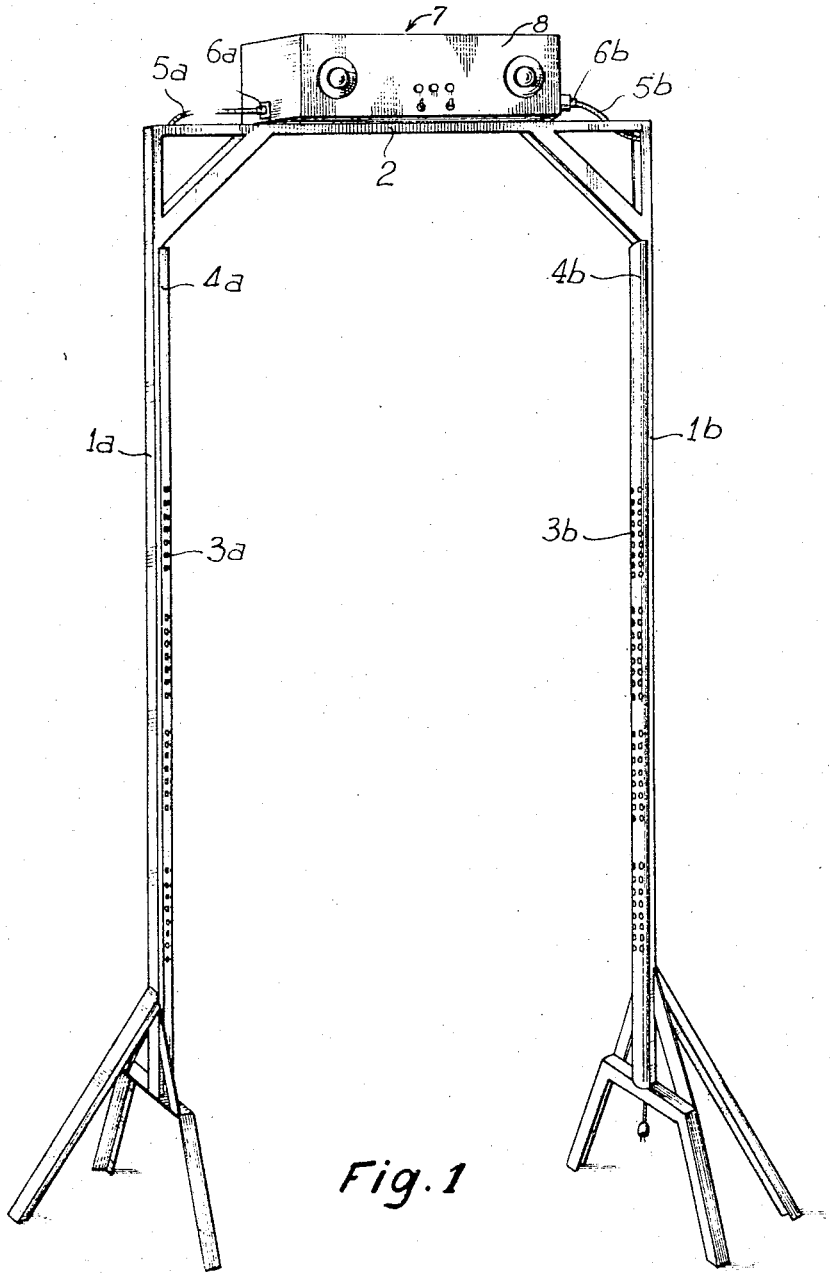
FIGURE 1 is a perspective view of the gantry and detector system.

Referring first to FIGURES 2 to 5, the references $a$ to $h$ denote check points where the various diagrams can be interconnected.

In the embodiment illustrated in the drawings, the gantry type detector according to the invention comprises a gantry 1 built up from welded U-section members and comprising two uprights 1a, 1b and a top cross-member 2. Disposed on the inside surface of each upright is a battery of Geiger-Muller detector tubes 3a, 3b which are connected in parallel with one another and protected from impacts by a plastic sheath 4a, 4b, for instance, of polyvinyl chloride. Through the agency of coaxial cables 5a, 5b having plugs 6a, 6b, the two batteries of tubes 3a, 3b are connected to an electronic device 7 which is enclosed in a casing 8 and secured to the cross-member 2. As will be described hereinafter, the casing 8 contains at least the electronic part of the system for which the block schematic diagram is given in FIG. 2.

Figure 2:
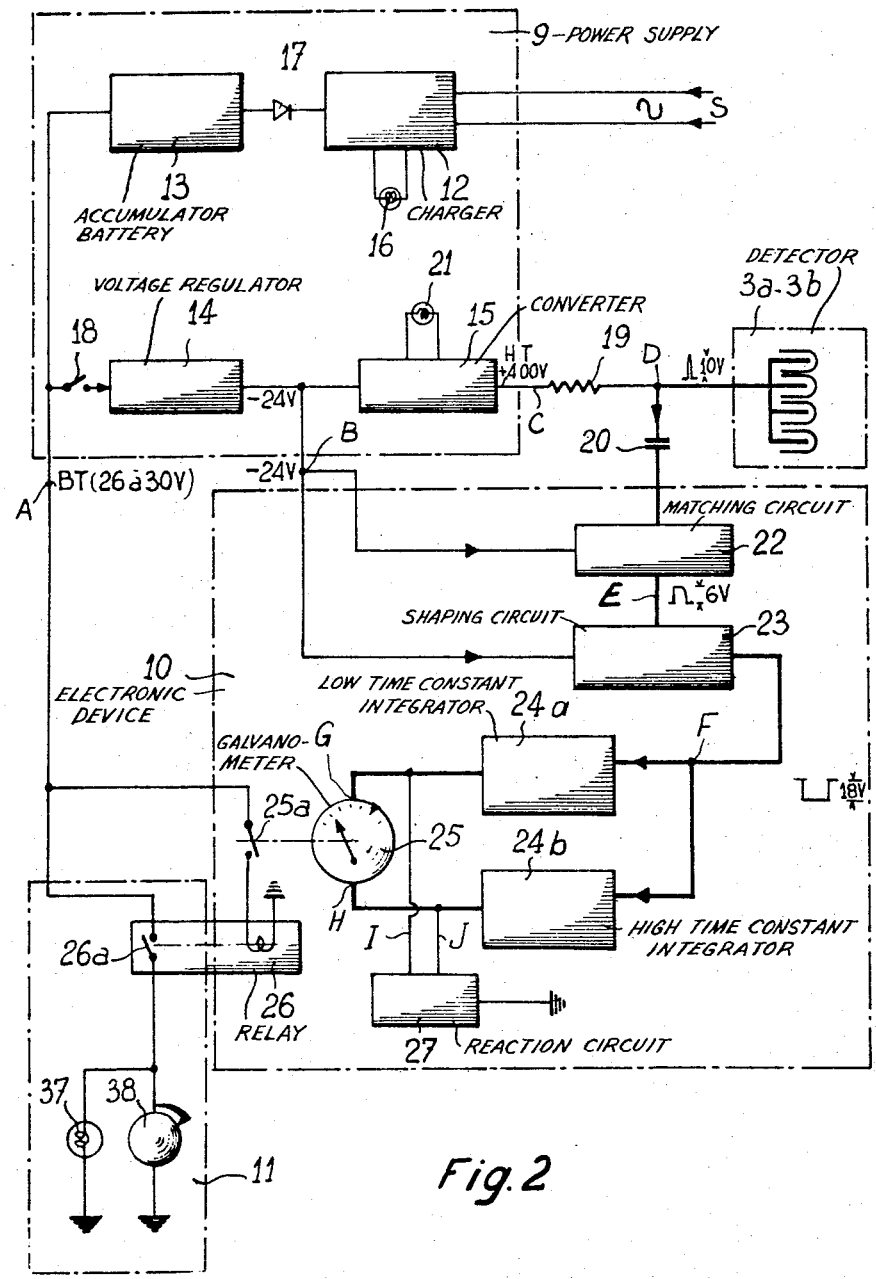
FIGURE 2 is a block schematic circuit diagram of the system.

In addition to the detectors 3a, 3b, the system illustrated in FIG. 2 comprises a device 9 supplying an electronic device 10 for operating a visual and/or audible warning device 11. The device 9 is supplied from supply mains S of 115 or 220 volts A.C. and comprises:

A terminal A at a low D.C. potential of about 27 volts which may in practice vary between 26 to 30 volts in operation;

A terminal B at a regulated D.C. potential of —24 volts, and

A terminal C at a high-tension D.C. potential of +400 volts.

This supply system can either be included with the device 7, as shown in FIG. 2, or form a casing separate from the casing 8 and possibly even separate from the gantry. The supply system has a charger 12 adapted to be connected to the mains S and having its output taken to an accumulator battery 13 connected directly, at the terminal A and elsewhere, to a voltage regulator 14 whose output terminal is at a potential of —24 volts to earth. The last-mentioned terminal is connected to the terminal B and to a converter 15 which steps up to 400 volts the potential of the terminal C.

The capacity of the battery 13 is such that the same can, in the event of a mains failure, supply the system for several hours. The voltage of the battery 13 varies from 30 to 26 volts during discharge. The low potential applied to the terminal A may therefore also vary between 30 and 26 volts as hereinbefore stated.

The charger can be of any kind appropriate for the voltage and mean output of the battery. Preferably, the charger comprises exclusively static and semiconductive elements and can comprise, for instance, a step-down transformer, a Graetz bridge cell, a filter cell and two transistors in a common collector circuit arrangement, the base voltage of the first transistor being adjustable by means of a potentiometer so that the battery can be charged at an average rate sufficient to keep the battery charged. The charger comprises a tell-tale lamp 16. The charger is connected to the battery via a rectifier 17 which prevents the battery from discharging back to the charger, and the battery is connected to the voltage regulator 14 by an on/off switch 18. The regulator 14 can be of a known transistorised kind including inter alia a voltage stabiliser and providing a D.C. output voltage stabilised to a value which can be adjusted by means of a potentiometer.

The converter 15 which is supplied with D.C. stabilised at —24 volts can be of any known kind and delivers a high-tension output of +400 volts. The converter 15 can comprise inter alia a conventional oscillator delivering, for instance, 10 ma. and comprising two push-pull transistors supplied with the stabilised —24 volts and delivering to the primary winding of a voltage step-up transformer having a transformation ratio of 20.

The transformer delivers to a rectifying and filtering circuit and is connected via a resistors 19 to the Geirger-Muller detectors 3a, 3b and, via a capacitance 20, to the electronic equipment 10.

The D.C. high-tension supplied by the converter to the detectors is regulated by the charger potentiometer and can be checked visually by means of a tell-tale lamp 21 supplied by the charge of a capacitance from a highly ohmic bridge so as to pulsate.

The electronic features forming the main part of the invention comprise (FIG. 2):

A matching circuit 22 which receives the pulses of the detector 3a, 3b via the capacitance 20 and which is supplied with the low voltage at the terminal B;

A shaping circuit 23 which receives at the terminal E the pulses delivered by the matching circuit 22 and which is connected to the terminal B;

A group of two integrators 24a, 24b which are arranged in opposition to one another and which are supplied with pulses received at a place F connected to the output of the circuit 23;

A galvanometer 25 controlling energisation of a sensitive relay 26 controlling the supply to the warning element 11, and A reaction circuit 27 for increasing the sensitivity of the system.

Figure 3:
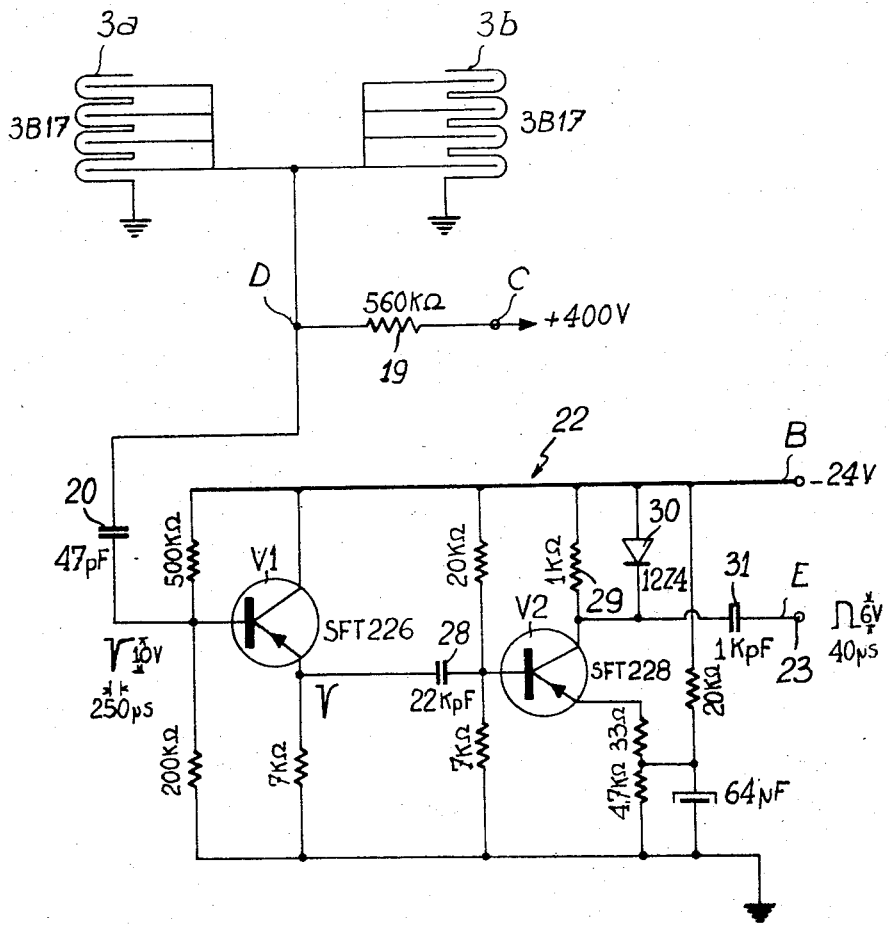
FIGURES 3 to 5 are detailed circuit diagrams for different parts of the electronic equipment.
Figure 4:
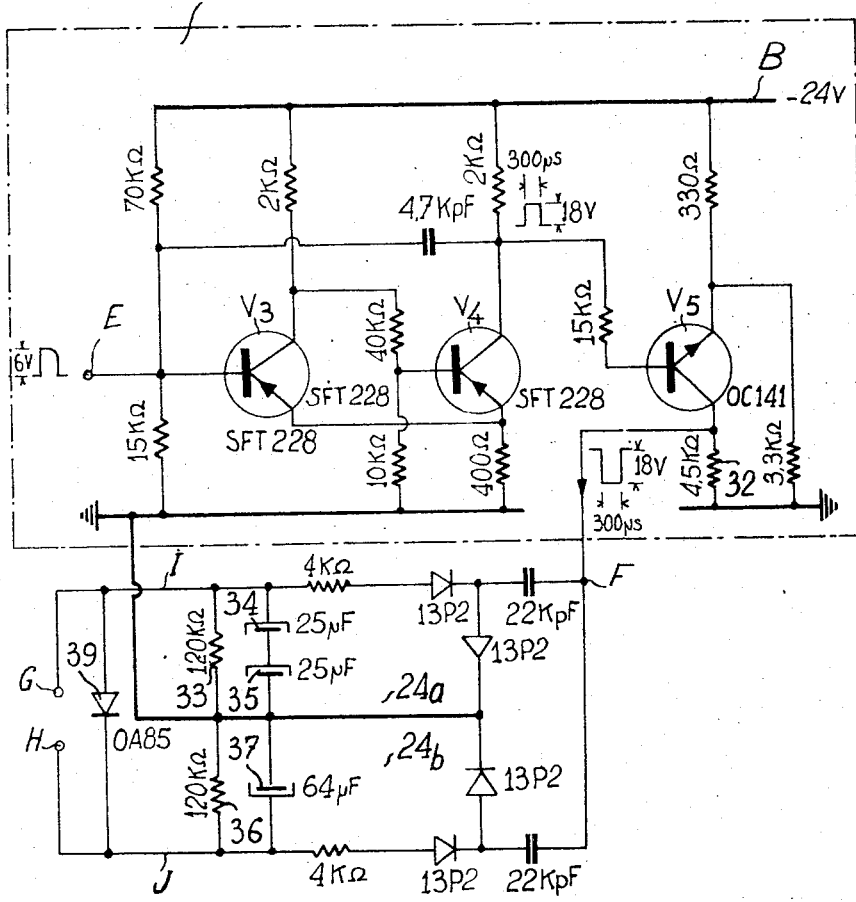
Figure 5:
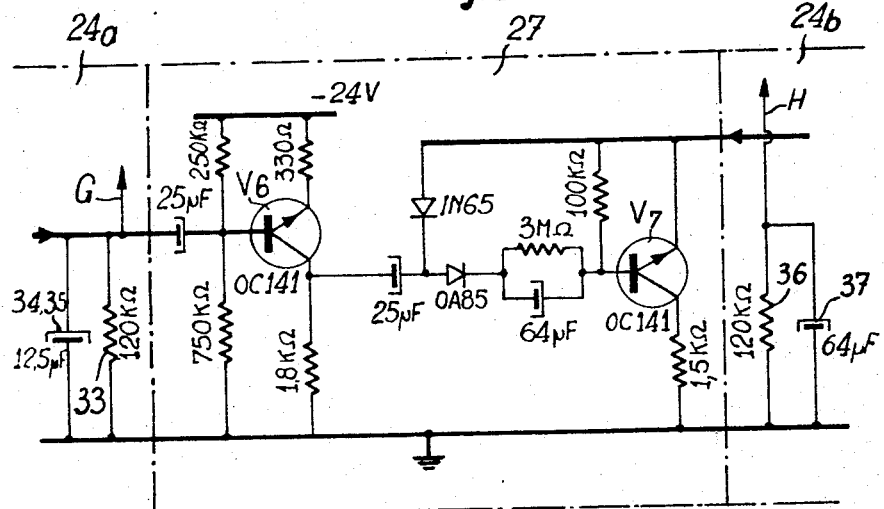
Figure 6A:
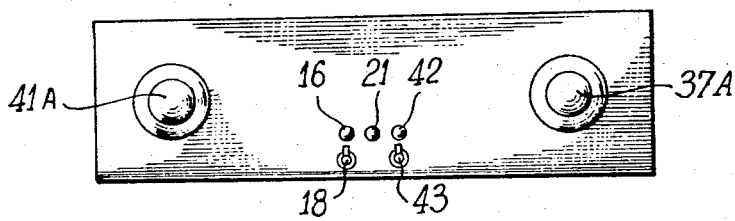
FIGURES 6A to 6D are views of the front, rear and side panels of the casing for the electronic equipment.
Figure 6B:
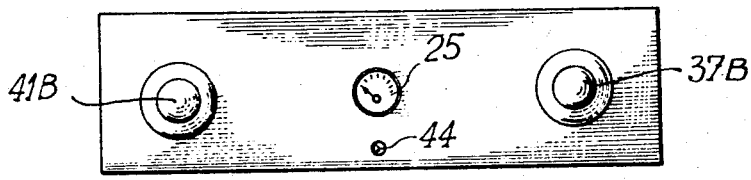
Figure 6C:
Figure 6D:
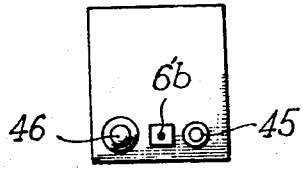

The matching circuit 22, the shaping and integrating circuits and the reaction circuit are ilustrated in detail in FIGS. 3 to 5 in which the technical particulars or standard names of the various components are indicated. In FIGS. 3 to 5, figures and letters with a circle around them are functional referenecs, and some of them denote similar devices in several figures.

The matching circuit 22, details of which are shown in FIG. 3, comprises a pre-amplifying circuit receiving from the detectors 3a, 3b negative pulses which are produced across the resistor 19 and have a duration of some 250 μsec. and an amplitude of several volts. The pulses sampled at the emitter of the transistor $V_1$ pass through a capacitance 28 to the base of a transistor $V_2$. The 1 kilohm load 29 of the collector of the transistor $V_2$ is shunted by a Zener diode 30 which ensures that all the pulses passing through a capacitance 31 to the shaping circuit 23 have an amplitude of +6 volts. The total dead time is some 300 μsec.

The shaping circuit 23, which can be seen in FIG. 4, comprises a flip-flop stage having two transistors $V_3$, $V_4$ (SFT 228). The calibrated +6-volt pulses, of a duration of some 40 μsec., which are received from the pre-amplifier are applied to the base of the transistor $V_3$. The positive peaks sampled at the collector of the transistor $V_2$ are applied to the base of a transistor $V_5$ (OC 141) enabling the integrating circuits to be driven at low impedance. The amplitude of the peaks sampled at the collector of the transistor $V_5$ and transmitted to terminal F is 18 volts and their ducation is very near the dead time (300 μsec.) of the detector and pre-amplifier circuits.

The two integrating circuits 24a, 24b, which can be seen in FIG. 4, are conventional condenser and diode arrangements and are connected in parallel to the terminal F supplied from a resistor 32 in the collector circuit of the transistor $V_5$. The time constants of the two circuits 24a, 24b are determined as follows:

In the case of the circuit 24a, by the product of the value of the resistor 33 (120 kilohms) with the value of the capacitance of the two serially connected capacitances 34, 35 (12.5 μf. in all)—i.e., 1.5 sec.—and In the case of the circuit 24b, by the product of the value of the resistor 36 (120 kilohms) with the value of the capacitance 37 (64 μf.)—i.e., 7.7 sec.

The two integrators are connected in opposition to terminals G, H of a "Sensitact" galvometer 25 forming a sensitive relay whose contacts 25a, visible in FIG. 2, controls the energisation of the secondary relay 26, the contact 26a thereof controlling application of the 26–30 volts to the warning circuit—i.e., for instance, to a visual telltale 37 and to an audible alarm 38. The "Sensitact" galvaometer 25 also forms an indicating device whose maximum deflection is produced by a current of 20 μa. The device is graduated from 0 to 100 and its contact can be adjusted between 0 and 100. A selector switch (not shown) can be provided to cut the audible warning device out of operation and cause a red tell-tale on the casing to light.

The reaction circuit shown in FIG. 5 is for increasing the triggering sensitivity of the alarm at low measures of radiation and comprises two OC 141 type n-p-n transistors $V_6$, $V_7$ in a common emitter arrangement. The output voltage variations of the low-time-constant integrating circuit 24a are applied to the base of the transistor $V_6$. The same is so connected to the transistor $V_7$ that the positive signal sampled at the collector of the transistor $V_6$ is transmitted to the base of the transistor $V_7$ to open the same.

The various connecting, starting, stopping and indicating elements can be arranged on the front, rear and side faces of the casing in the manner shown in FIGS. 6A to 6D where there can be seen:

Two green tell-tales marked "MAINS" and having the references 41A (front) and 41B (back) and supplied by the mains when the same is connected;

Two red "WARNING" tell-tales 37A (front) and 37B (back) corresponding to the tell-tale 37 in the diagram in FIG. 2;

The "BATTERY CHARGING" tell-tale 16 in the charger;

The "HT" tell-tale 21 in the converter;

An "AUDIBLE WARNING OFF" tell-tale 42 and an audible warning switch 43;

The main "ON/OFF" switch 18;

The dial of the galvanometer 25;

An "ALARM OFF" tell-tale 44;

Sockets 6a, 6b for the coaxial cable end plugs;

A mains connection plug 45, and

A plug 46 for a line reading to an "ALARM OFF" push-button in the supply circuit of the supply system for the integrators. Of course, this list and the arrangements illustrated in the drawings are not limitative.

The system operates as follows:

In the presence of a permanent ambient background noise, the two integrating circuits 24a, 24b apply equal and opposite potentials to the galvanometer and so the needle thereof indicates zero. When a radiation source passes between the two rows of Geiger-Muller detectors, the pulses are simultaneously transmitted—after amplification and shaping—to the two integrating circuits 24a, 24b. Since the slope of the variation of the voltage of the output of the circuit 24a having the low time constant $\theta_1$ is 5 times greater than the slope of the voltage at the output of the integrating circuit 24b having the larger time constant $\theta_2$, the voltage $V_S$ operative at the galvanometer terminals is:

$$V_S = E\left(e^{-\frac{t}{\theta_2}} - e^{-\frac{t}{\theta_1}}\right)$$

In other words, it can be said that the integrating circuit 24a has time to operate the galvanometer before the circuit 24b has time to buck. The voltage applied to the galvanometer 25 causes the same to deflect so that the secondary relay 26 is energised and operates the audible warning and the "WARNING" tell-tale 37. The difference between the time constants therefore helps to ensure correct sensitivity while obviating the effects of steady fluctuations which might otherwise trigger the alarm accidentally.

After the moving radiation source has passed by, the circuit 24b operates and the voltage across the galvanometer terminals reverses, but the diode 39 (FIG. 4)

across the galvanometer terminals becomes conductive and so the galvanometer needle is not deflected from zero. While the system is in operation, the transistor $V_7$ of the reaction circuit, opened by the transistor $V_6$, becomes conductive and reduces the output voltage of the integrating circuit $24b$. There is therefore an extra increase in the voltage across the galvanometer terminals and the increase is added to the increase produced by the circuit $24a$, so that the trigger sensitivity of the warning to small measurements is increased.

I claim:

1. $\beta$ and $\gamma$ radiation detection device for measuring radiation in the presence of heavy background radiation comprising two integrator circuits, a plurality of elements responsive to the radiations to be detected connected to said circuits, said circuits being connected to buck each other and an indicator directly connected to said circuits for comparing the signals from said circuits, said circuits having different time constants.

2. The detection device as described in claim 1 including a gantry, said device being mounted on said gantry for determining and warning of the radioactivity of personnel and articles passing below said gantry, said time constants being on the order of seconds and one of said time constants being on the order of five times greater than the other of said time constants and said radiation responsive elements being Geiger-Muller detectors disposed inside uprights of said gantry.

3. Detection device as described in claim 2, the difference between said time constants of said integrator circuits being greater than 5 seconds.

4. Detection device as described in claim 2, said elements being connected to said integrator circuits through a pre-amplifier and an electronic flip-flop shaping circuit, said indicator being a galvanometer, a relay controlled by said galvanometer, warning elements controlled by said relay and a circuit connected to said indicator increasing the sensitivity of said indicator at low radiation.

5. Detection device as described in claim 4, said integrator circuits being connected through a first transistor and a second transistor connected in series, said first transistor when energized opening said second transistor.

References Cited

UNITED STATES PATENTS

| | | | |
|---|---|---|---|
| 2,458,596 | 1/1949 | Herzog | 250—83.6 |
| 2,469,383 | 5/1949 | Gibbs et al. | 250—83.6 |
| 2,474,271 | 6/1949 | Meyer | 250—106 X |
| 2,493,346 | 1/1950 | Herzog | 250—83.6 |
| 2,573,823 | 11/1957 | Barghausen et al. | 250—83.6 |
| 2,730,896 | 1/1956 | DeBoisblanc | 340—261 |
| 3,122,641 | 2/1964 | Pinckaers | 250—83.3 |

RALPH G. NILSON, *Primary Examiner.*

S. ELBAUM, *Assistant Examiner.*